United States Patent [19]
Longust et al.

[11] Patent Number: 5,195,836
[45] Date of Patent: Mar. 23, 1993

[54] GUIDEWAY AND SUPPORT STRUCTURE FOR A PRINTER/PLOTTER CARRIAGE

[75] Inventors: Timothy A. Longust, San Diego; David Petersen, Poway, both of Calif.

[73] Assignee: Hewlett-Packard Company, Palo Alto, Calif.

[21] Appl. No.: 784,282

[22] Filed: Oct. 29, 1991

[51] Int. Cl.⁵ .............................................. B41J 11/22
[52] U.S. Cl. ..................................................... 400/354
[58] Field of Search ............ 400/120, 352, 354, 354.3; 346/75, 145

[56] References Cited

U.S. PATENT DOCUMENTS

| | | | |
|---|---|---|---|
| 2,789,675 | 4/1957 | Gebauer | 400/353.4 |
| 3,245,512 | 4/1966 | Heyer | 400/354 |
| 4,222,673 | 9/1980 | Plaza et al. | 400/352 |
| 4,381,896 | 5/1983 | Shiurila | 400/352 |

FOREIGN PATENT DOCUMENTS 2945642 5/1981 Fed. Rep. of Germany ...... 400/354

OTHER PUBLICATIONS

"Supporting Rail Structure for Matrix Printhead" IBM Tech. Discl. Bulletin, vol. 25, No. 5, Oct. 1982 p. 2661.
"Load Beam Antiwind-Up Structure" IBM Tech. Discl. Bulletin, vol. 27, No. 5, Dec. 1984 pp. 2946–2947.

*Primary Examiner*—Eugene H. Eickholt

[57] ABSTRACT

A rigid low cost chassis structure for a wide print media thermal ink jet plotter wherein the carriage slider rods are straightened and held in precise position relative to the platen roller during assembly of the chassis parts and operation of the plotter by using an extruded rigid support beam and a pair of rigid endplates and connecting structure which positions and holds the slider rods.

22 Claims, 7 Drawing Sheets

GUIDEWAY AND SUPPORT STRUCTURE FOR A PRINTER/PLOTTER CARRIAGE

BACKGROUND OF THE INVENTION

The present invention relates generally to the field of computer driven printer/plotters, particularly wide print media printer/plotters in which paper or other printing media is drawn from a roll thereof in a first direction through the apparatus and a linearly moveable carriage which holds an ink applicator means such as a pen or pens or thermal inkjet printing heads or the like is supported or suspended on a relatively rigid guideway which extends transversely to the direction of paper movement whereby the carriage and print heads may repeatedly traverse the entire width of the paper or other printing medium.

Although it is a relatively straightforward matter to provide a rigid support and suspension mechanism for a print head carriage, to do so without significant expense becomes increasingly difficult as the width of the printing path increases. Printing path widths of three or four feet are not uncommon.

Prior art solutions to the problem include the provision of a carriage guideway which employs two precisely straight and parallel slider rods on which the print head carriage is supported. The rods must be pre-straightened to highly accurate tolerance before installation on the other supporting structure or plotter chassis. The technical processes required to accurately pre-straighten the slider rods are complicated and expensive.

Other solutions to the problem of providing a carriage guideway inlude use of a single precisely straight slider rod in conjunction with machined extrusions or precision sheet metal parts to act as a second reference. Both of these solutions involve high costs due to precision machining requirements and/or specialized fabrication equipment.

In the prior art, the pre-straightened rods or carefully machined rods or rails used to support the carriage are ordinarily suspended only at their ends and are thus susceptible to vibration deflections. For wide print media applications, suspension of the slider rods or rails merely at their ends is insufficient therefore mounting of the rods or rails along their length at intermediate support points is required. The intermediate points of support are typically precision machined on the supporting chassis so that the prestraightened rods are maintained straight at all times. This is not cost effective due to the complicated procedure required to accurately machine and position the support points along the chassis to ensure support of the rods or rails in a perfectly straight orientation.

The present invention is directed to the problem of providing a less expensive means of supporting and holding the carriage rods or rails in an acceptably straight and parallel relationship to ensure proper positioning of the print head carriage as it traverses above the paper or other print media.

Precise positioning of the print head with constant distance between it and the media as the print head traverses the media during plotting is particularly acute in inkjet printing head applications. The guideway and support structure for the carriage disclosed herein is particularly adapted for use with a thermal inkjet printhead although the structure can also be used with plotter carriages other than those which use thermal inkjet printheads.

The present invention accordingly provides a guideway and support structure for a printer/plotter carriage comprising:
a. an elongated beam having a pair of spaced ends;
b. a first generally planar sideplate having a cradle thereon, said sideplate being securely affixed to one of said spaced ends of said beam;
c. a second generally planar sideplate having a cradle thereon, said sideplate being securely affixed to the other of said spaced ends of said beam;
d. an elongated X yoke having stiffness in a first (X) direction of a three dimensional rectangular coordinate system;
e. at least one Z yoke having stiffness in a second (Z) direction of said coordinate system;
f. at least one bridge disposed between said sideplates in a location which divides said beam into approximately equal length sections, said bridge having rod cradles thereon for supporting spaced parallel carriage slider rods extending substantially parallel to said beam;
g. a pair of parallel carriage slider rods supported in said cradles on said sideplates and in said cradles in said bridge;
h. a first set of fasteners clamping said rods to said bridge cradles and to said X yoke and clamping said rods to said cradles on said sideplates;
i. a second set of fasteners affixing said Z yoke or yokes to said beam; and
j. a third set of fasteners affixing said X yoke to said beam.

DETAILED DESCRIPTION

Figure 1:
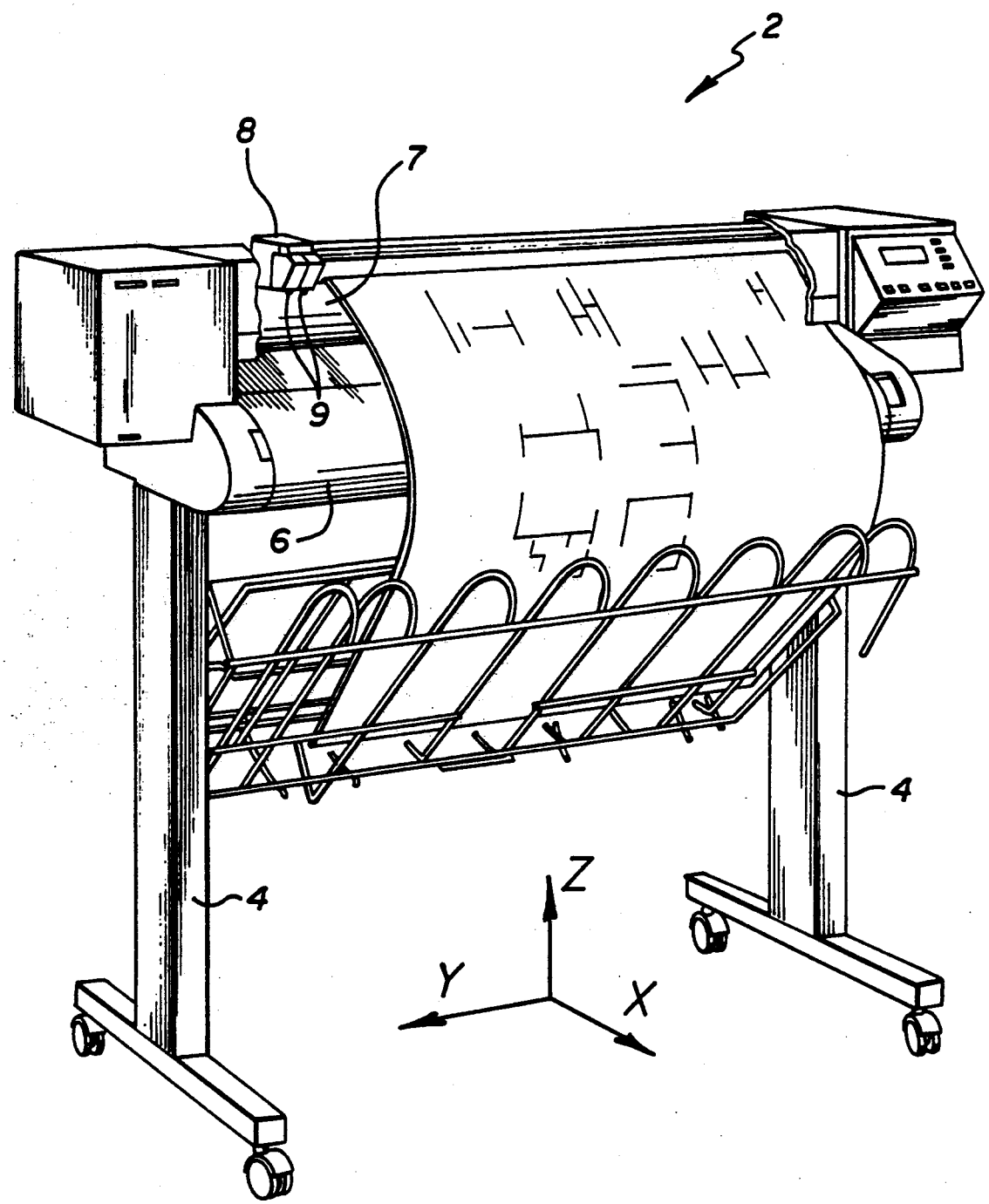
FIG. 1 is a perspective view of a printer/plotter showing the cover partly broken away to reveal a platen roller and a print head carriage mounted on slider rods which extend parallel to the axis of the platen roller.
Figure 3:
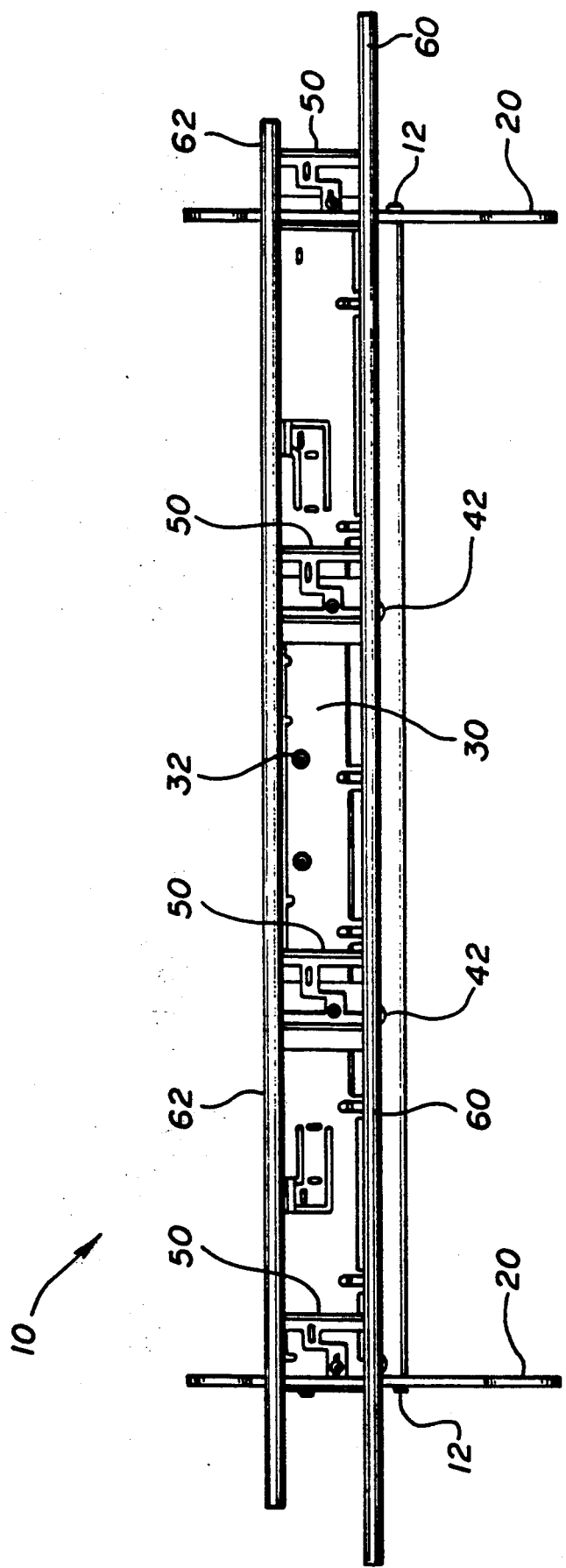
FIG. 3 is a plan view of the guideway and support structure shown in FIG. 2.
Figure 4:
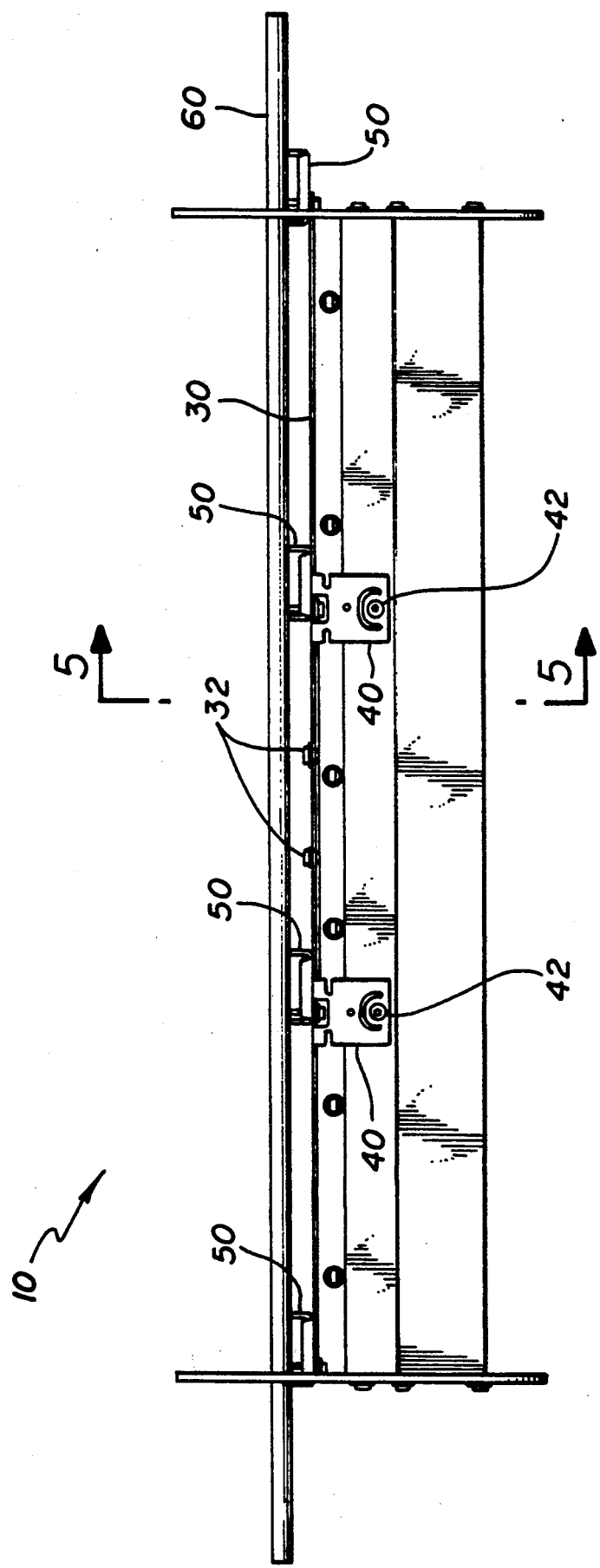
FIG. 4 is a front elevational view of the guideway and support structure of FIG. 2.

FIG. 1 is a perspective view of a printer/plotter mechanism having a chassis 2 supported by a pair of spaced legs 4 and a housing which includes a generally arcuate cover 6 for containing a roll 7 (FIG. 3) of print medium such as paper, vellum or film. As seen in the broken away section at the top of FIG. 1, a platen roller 7 extends transversely of the apparatus in the Y direction to provide a support and printing path at its upper surface for the medium upon which printing is to take place. A pair of slider rods (not seen) support a transversely movable print head carriage 8 having a thermal inkjet print head or a plurality of thermal inkjet print heads 9 mounted thereon which are positioned a precise distance above the platen roller 7.

Figure 2:
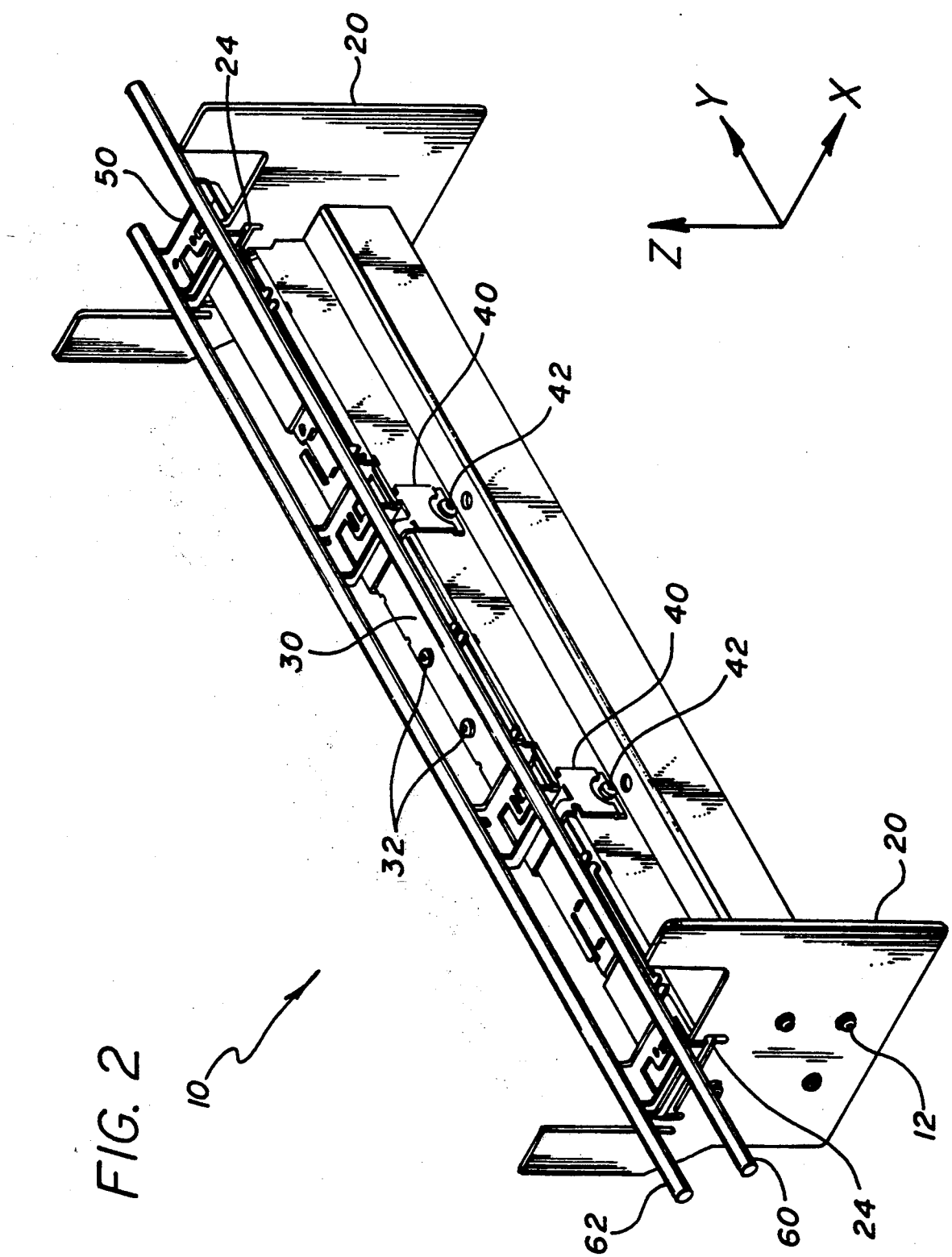
FIG. 2 is a perspective view of a guideway and support structure for a printer/plotter carriage constructed according to the present invention.
Figure 7:
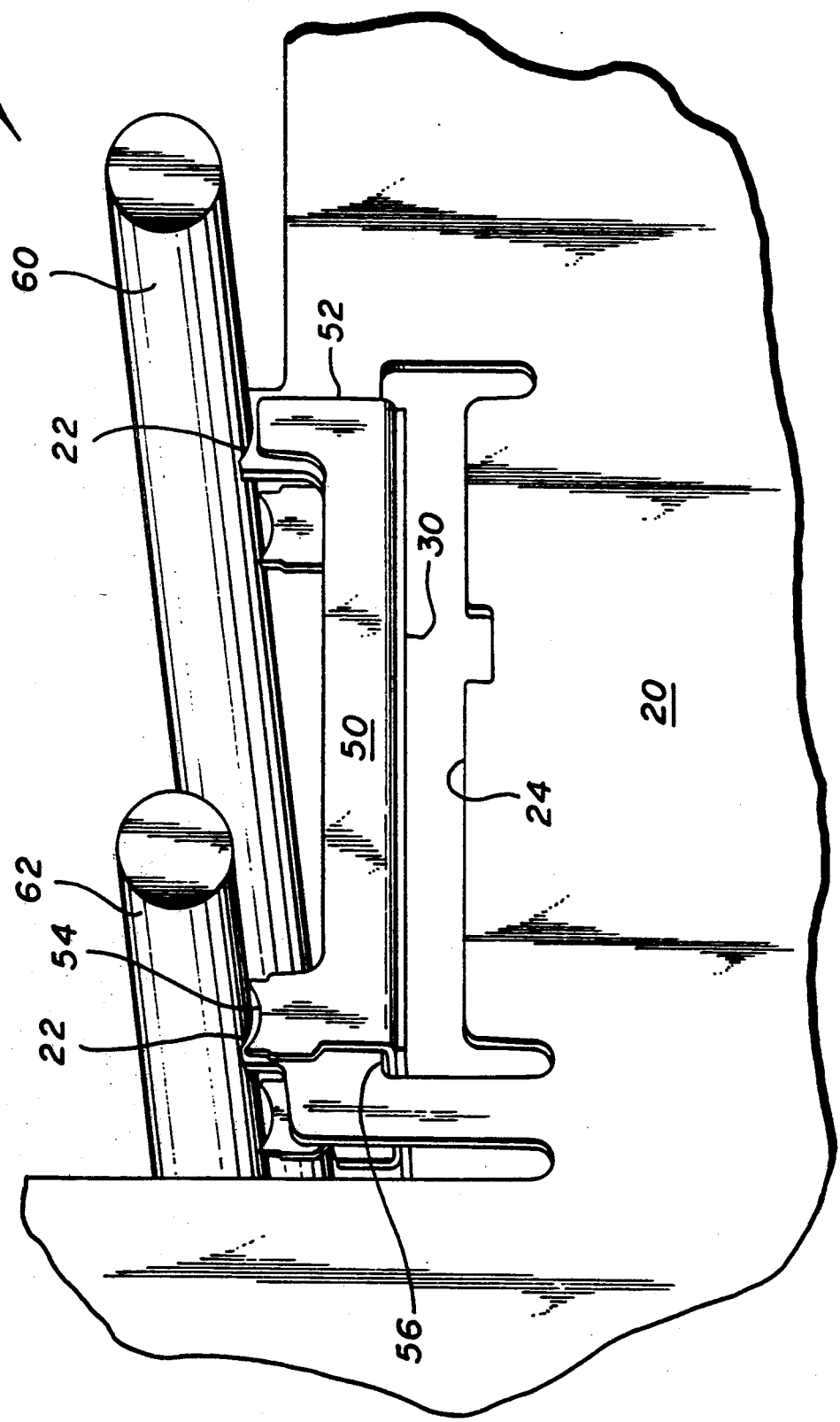
FIG. 7 is an enlarged detail perspective view.

FIG. 2 shows a guideway and support structure for a plotter carriage comprised of an elongated beam 10 which is connected by threaded fasteners 12 at its ends to two parallel spaced generally planar sideplates 20. As best seen in FIG. 7, each sideplate 20 has a pair of upstanding rod cradles 22 therreon and a generally horizontally extending envelope slot 24 for receiving part of a bridge 50 which will be described below. The beam 10 is preferably an aluminum extrusion which is extremely rigid in all degrees of freedom and serves as the main structural member. Close dimensional tolerance of the beam 10 in the manufacturing process is not required.

The beam extends generally along what will be referred to as the Y axis of a rectangular coordinate system. In this system, the X axis is a horizontal axis defining the path of movement of the printing medium; the Y axis is a second horizontal axis normal to the X axis and defines the path of printer carriage movement; and the Z axis is the vertical axis.

An elongated generally rectangular stamped sheetmetal plate referred to as the X yoke 30 is placed on top of the beam 10 and affixed thereto by a pair of vertically extending threaded fasteners 32 and additionally in a manner which will be described below. The X yoke 30 has a relatively large thickness in both of the X and Y directions but is relatively thin in the Z or vertical direction whereby the X yoke 30 may be considered relatively stiff in both of the X and Y directions and relatively compliant or flexible in the Z direction.

At least one U or channel shaped member referred to as a Z yoke 40 is positioned as shown to be fastened to the beam 10 by horizontally extending threaded fasteners 42 which are received in mating apertures in the flanges of the Z yoke and beam. The apertures in the vertically extending web of the Z yoke or yokes 40 are sized large enough to permit precise adjustment of the position of the Z yokes 40 relative to the beam 10 whereby precise dimensional manufacturing tolerance of the Z yokes is not required. The Z yokes 40 are carefully positioned and clamped to the beam 10 during assembly of the structure to thereby precisely position and straighten rods 60, 62 to the required tolerance.

Figure 6:
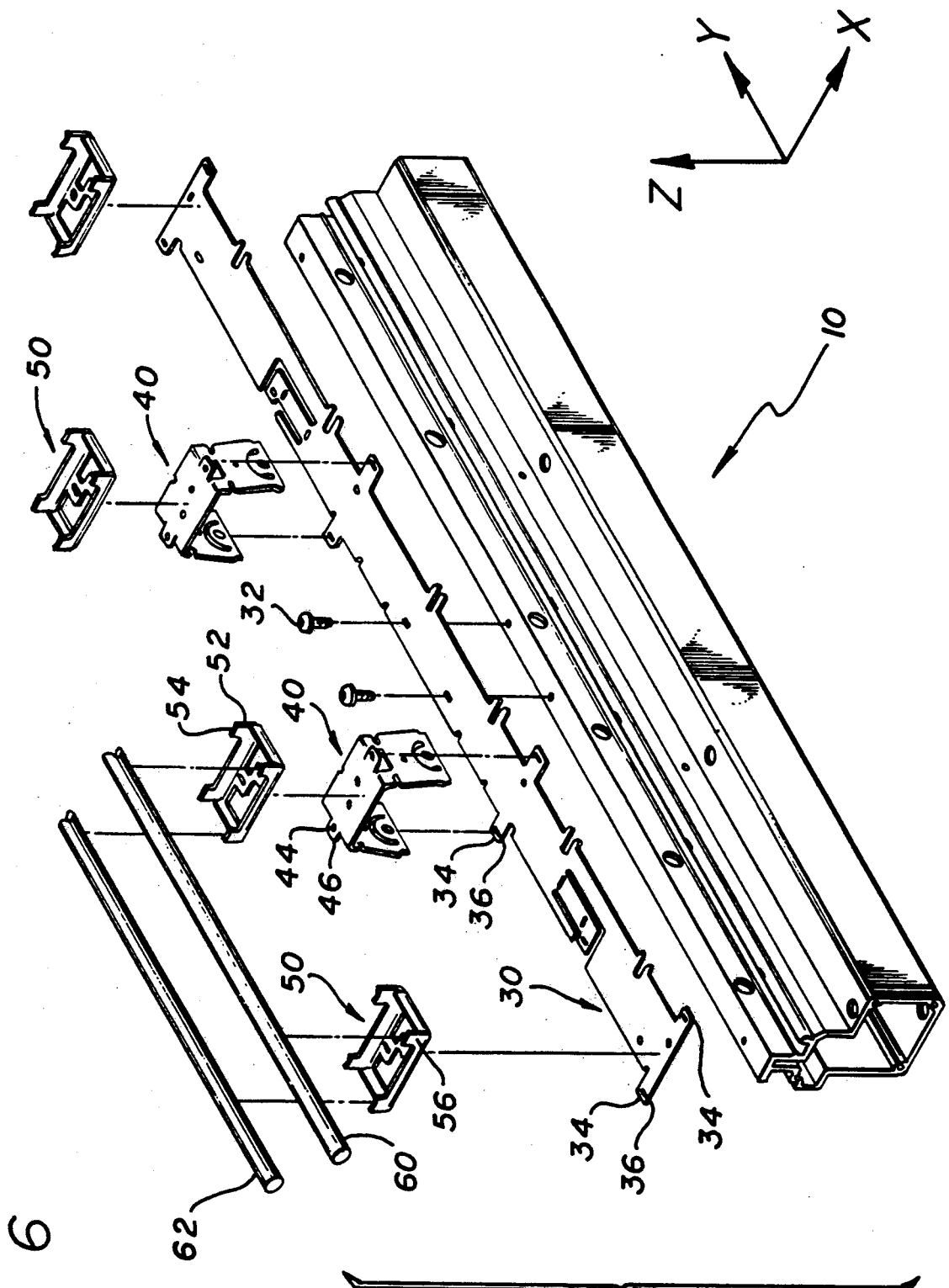
FIG. 6 is an exploded perspective view of various parts of the invention.

At least three and preferably four bridges 50 best seen in FIG. 6 comprising relatively inexpensive stamped sheet metal parts of generally planar configuration and bent to have four upstanding ears 52 at the corners are provided. Three of the four ears 52 on each bridge 50 has a generally arc or V-shaped cradle 54 formed thereon for reception and support of carriage slider rods 60, 62 or rails which must be maintained in a precise position relative to each other and in a precise position relative to the medium on which printing is to take place. As seen in FIG. 6, the right ears of the two intermediate bridges 50 which underlie rod 62 have a flat upper surface. Also as seen in FIGS. 6 and 7, the left ears of the two endmost bridges 50 which underlie the rod 60 also have a flat upper surface thereon. These flat upper surfaces permit the bridges 50 to be manufactured without a high degree of dimensional tolerance.

The carriage slider rods 60, 62 provide a guideway for movement of the printer head carriage back and forth in the Y direction. Carriage slider rods 60, 62 are affixed to the bridges 50 and to the X yoke 30 by a plurality of vertically extending fasteners 64 (FIG. 5) which are preferably threaded screws received in threaded apertures provided for this purpose in the underside of the carriage slider rods 60, 62. Two fasteners 64 extend through the left end horizontal surface of each bridge 50.

The Z yoke or yokes 40 are attached to the beam 10 by the threaded fasteners 42.

Although the drawings show a pair of Z yokes 40 positioned at spaced points along the beam 10 to divide the beam length into three approximately equal length sections, it will be appreciated that a single Z yoke 40 can be used in appropriate circumstances where the length of the guideway and support structure is not substantial. On the other hand, more than two Z yokes 40 may be provided if desired for a particularly wide plotter carriage guideway and support structure intended for use with relatively wide printing media. Also, the preferred arrangement shows four bridges 50 comprising two at the ends and two positioned in proximity to the Z yokes 40.

The X yoke 30 is preferably provided with a plurality of oppositely spaced ears 34, each of which has a fastener receiving aperture 36 therein and is intended to align with vertical fastener receiving apertures 44 provided in ears 46 on the Z yokes 40 (FIG. 6). The Z yokes may be additionally affixed to the X yoke by vertically extending threaded fasteners 48 (FIG. 5) to add rigidity to the assembled structure to withstand shock in the Y direction. It is contemplated, however, that the fasteners 48 extending through the ears 34 and fastener receiving apertures 36 on the X yoke are not strictly essential.

Figure 5:
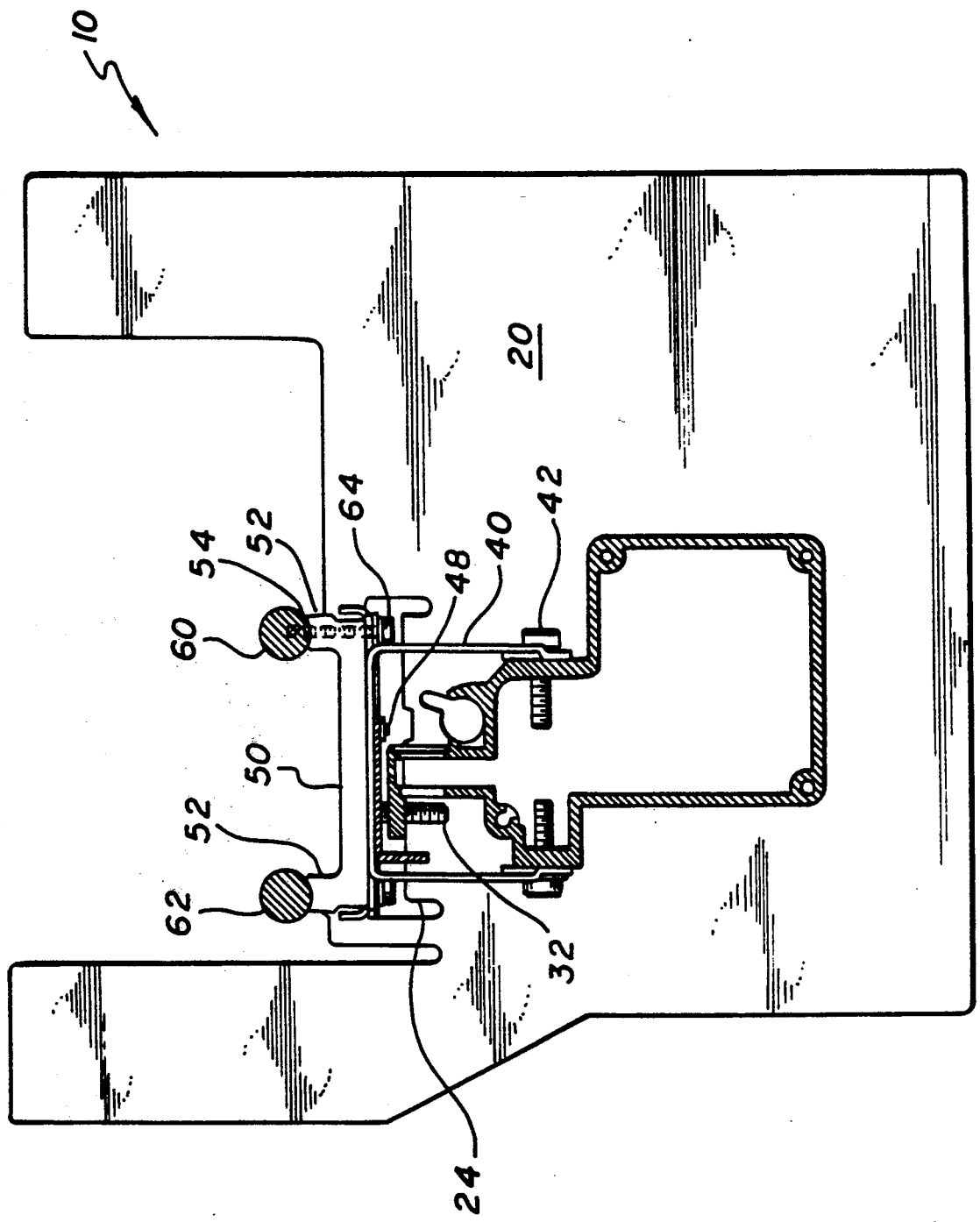
FIG. 5 is a cross sectional view of the guideway and support structure taken at lines 5—5 in FIG. 4.

The pair of fasteners 32 received in complimentary apertures located near the center of the X yoke 30 securely fasten the X yoke to the beam 10 at that location. As best seen in FIGS. 5 and 6, the bridges 50 each have vertically extending slots 56 therein for receiving the downwardly facing upper edges of the envelope slots 24 in the sideplates 20 whereby the endmost bridges 50 may then be securely fastened to the adjacent sideplates 20 in a manner which clamps the rods 60, 62 down against the sideplate cradles 22 (FIG. 7) thus permitting thermal expansion and contraction movement of the rods 60, 62 and consequent flexing movement of the sideplates in the Y direction without disturbing the vertical position of the slider rods 60, 62.

Although many of the features and the advantages of the invention will have already become apparent to those skilled in the art, the foregoing assembly provides a low cost guideway and support structure for a printer/plotter carriage in which, during assembly of the structure, the carriage slider rods 60, 62 are automatically straightened and positioned in precise parallel relationship to each other. The beam 10 is an extrusion which requires little machining and provides a stable base to which the other parts of the structure may be readily attached.

The side plates 20 are made of fine blanked sheet metal which only needs to provide structural and twisting rigidity and a means to attach the other parts of the plotter such as the platen roller (not shown). It will be appreciated that the platen roller is not a part of the present invention but, when attached to the side plates 20, it is precisely positioned relative to the slider rods 60, 62 so that a thermal inkjet printer head carriage traveling on the rods maintains a constant and precise spacing in the X and Z directions from the platen roller as the carriage traverses from side to side of the print medium. It is to be emphasized that the rods 60, 62 need not be pre-straightened to a high dimensional tolerance as is conventional, but instead are bent straight to the required tolerance as they are attached to and are held straight by the uniquely constructed support structure described above. Use of multiple bridges 50 to provide multiple mounting or support points for the slider rods 60, 62 along their length allows smaller diameter slider rods to be used while the apparatus is still capable of withstanding the vibration inherent during its use.

It will be appreciated that the slider rods 60, 62 need not themselves be directly attached to the sideplates 20. Rather they are clamped thereto and are supported by the sideplate dradles 22 by the clampinfg of the bridges 50 to the sideplates as described above. Reception of the upper edges 22 of envelope windows 24 in the slots 56 in the endmost bridges permits the slideplates to deflect slightly in the Y direction under variations of ambient temperature without degradation of rod straightness.

It will also be noted that the fastening arrangement holds and stabilizes both slider rods 60, 62 against movement in all of the X, Y and Z directions. With the support of both rods at various spaced points along their length as described, it will become apparent that the printer carriage is stabilized in the X and Z directions such that it maintains a constant spacing from the platen roller and print medium to ensure precise printing for a thermal inkjet printhead.

We claim:

1. A guideway and support structure for a printer/plotter carriage comprising:
   a. an elongated beam having a pair of spaced ends;
   b. a first generally planar sideplate having a cradle thereon, said sideplate being securely affixed to one of said spaced ends of said beam;
   c. a second generally planar sideplate having a cradle thereon, said sideplate being securely affixed to the other of said spaced ends of said beam;
   d. an elongated X yoke having stiffness in a first (X) direction of a three dimensional rectangular coordinate system;
   e. at least one Z yoke having stiffness in a second (Z) direction of said coordinate system;
   f. at least one bridge disposed between said sideplates in a location which divides said beam into approximately equal length sections, said bridge having rod cradles thereon for supporting spaced parallel carriage slider rods extending substantially parallel to said beam;
   g. a pair of parallel carriage slider rods supported in said cradles on said sideplates and in said cradles in said bridge;
   h. a first set of fasteners clamping said rods to said bridge cradles and to said X yoke and clamping said rods to said cradles on said sideplates;
   i. a second set of fasteners affixing said Z yoke or yokes to said beam; and
   j. a third set of fasteners affixing said X yoke to said beam.

2. The apparatus of claim 1, further comprising a bridge adjacent each sideplate, said first set of fasteners including fasteners clamping said bridges to said sideplates.

3. The apparatus of claim 2, wherein said bridges adjacent said sideplates extend partially through said sideplates.

4. The apparatus of claim 1, further comprising a fourth set of fasteners affixing said X yoke to said Z yoke or yokes.

5. The apparatus of claim 1, wherein said beam is substantially more rigid than said rods, whereby said securely affixed beam, sideplates, X yoke, said Z yoke or yokes and said bridge or bridges comprise a rigid chassis assembly for holding the rods straight and substantially parallel to each other.

6. The apparatus of claim 5, wherein said cradles and fasteners straighten each of said rods in both the X and Z directions during assembly of the apparatus and maintain the straightness.

7. The apparatus of claim 5, wherein said Z yoke is compliant in the X direction.

8. The apparatus of claim 7, wherein said X yoke is stiff in both the X and Y directions.

9. The apparatus of claim 8, wherein said X yoke is compliant in the Z direction.

10. The apparatus of claim 1, wherein said sideplates are interchangeable with each other.

11. The apparatus of claim 1, wherein said sideplates are permitted to deflect in the Y direction under thermal temperature changes.

12. A printer/plotter apparatus which includes:
   a. a carriage guideway and support structure;
   b. a platen roller mounted on said apparatus;
   c. said guideway and support structure comprising:
      1) an elongated beam having a pair of spaced ends;
      2) a first generally planar sideplate having a cradle thereon, said sideplate being securely affixed to one of said spaced ends of said beam;
      3) a second generally planar sideplate having a cradle thereon, said sideplate being securely affixed to the other of said spaced ends of said beam;
      4) an elongated X yoke having stiffness in a first (X) direction of a three dimensional rectangular coordinate system;
      5) at least one Z yoke having stiffness in a second (Z) direction of said coordinate system;
      6) at least one bridge disposed between said sideplates in a location which divides said beam into approximately equal length sections, said bridge having rod cradles thereon for supporting spaced parallel carriage slider rods extending substantially parallel to said beam;
      7) a pair of parallel carriage slider rods supported in said cradles on said sideplates and in said cradles in said bridge;
      8) a first set of fasteners clamping said rods to said bridge cradles and to said X yoke and clamping said rods to said cradles on said sideplates;
      9) a second set of fasteners affixing said Z yoke or yokes to said beam; and
      10) a third set of fasteners affixing said X yoke to said beam; and wherein said apparatus further includes
   d. a printhead carriage mounted on slider rods for movement back and forth along a third direction (Y axis) of said rectangular coordinate system; and
   e. means for moving said carriage on said slider rods.

13. The apparatus of claim 12, further comprising a bridge adjacent each sideplate, said first set of fasteners including fasteners clamping said bridges to said sideplates.

14. The apparatus of claim 13, wherein said bridges adjacent said sideplates extend partially through said sideplates.

15. The apparatus of claim 12, further comprising a fourth set of fasteners affixing said X yoke to said Z yoke or yokes.

16. The apparatus of claim 12, wherein said beam is substantially more rigid than said rods, whereby said securely affixed beam, sideplates, X yoke, said Z yoke or yokes and said bridge or bridges comprise a rigid chassis assembly for holding the rods straight and substantially parallel to each other.

17. The apparatus of claim 16, wherein said cradles and fasteners straighten each of said rods in both the X and Z directions during assembly of the apparatus and maintain the straightness.

18. The apparatus of claim 16, wherein said Z yoke is compliant in the X direction.

19. The apparatus of claim 18, wherein said X yoke is stiff in both the X and Y directions.

20. The apparatus of claim 19, wherein said X yoke is compliant in the Z direction.

21. The apparatus of claim 12, wherein said sideplates are interchangeable with each other.

22. The apparatus of claim 12, wherein said sideplates are permitted to deflect in the Y direction under thermal temperature changes.

* * * * *